US006579356B2

(12) United States Patent
Loucka et al.

(10) Patent No.: US 6,579,356 B2
(45) Date of Patent: Jun. 17, 2003

(54) HIGH STRENGTH FE-CR BROWN WITH EXCELLENT WEATHERING

(75) Inventors: William Gerald Loucka, Fairview Park, OH (US); Mark Edward Gall, South Euclid, OH (US); John Gilbert Richardson, Pagosa Springs, CO (US)

(73) Assignee: Engelhard Corporation, Iselin, NJ (US)

( * ) Notice: Subject to any disclaimer, the term of this patent is extended or adjusted under 35 U.S.C. 154(b) by 45 days.

(21) Appl. No.: 09/907,264

(22) Filed: Jul. 17, 2001

(65) Prior Publication Data

US 2003/0027911 A1 Feb. 6, 2003

(51) Int. Cl.$^7$ .................................................. C09C 1/34
(52) U.S. Cl. ..................... 106/453; 106/31.6; 106/31.9; 106/441; 106/456; 524/398; 524/399; 524/407; 524/492
(58) Field of Search ............................... 106/31.6, 31.9, 106/441, 453, 456; 524/398, 399, 407, 492

(56) References Cited

U.S. PATENT DOCUMENTS

| | | | |
|---|---|---|---|
| 3,615,810 A | 10/1971 | Holznagel et al. | 106/304 |
| 4,205,996 A | 6/1980 | Eppler | 106/302 |
| 4,624,710 A | 11/1986 | Modly | 106/290 |
| 4,643,772 A * | 2/1987 | Gaedcke et al. | 106/453 |
| 4,921,542 A | 5/1990 | Rademachers et al. | 106/456 |
| 4,966,641 A | 10/1990 | Westerhaus et al. | 106/456 |
| 5,002,609 A | 3/1991 | Rademachers et al. | 106/456 |
| 5,250,112 A | 10/1993 | Wussow et al. | 106/453 |
| 5,269,841 A | 12/1993 | Kuske et al. | 106/456 |
| 5,718,755 A | 2/1998 | Kohler et al. | 106/456 |
| 6,235,106 B1 * | 5/2001 | Loucka et al. | 106/453 |
| 6,235,372 B1 * | 5/2001 | Joedicke | 428/145 |

OTHER PUBLICATIONS

Patent Abstracts of Japan, vol. 017, No. 303 (C–1069), Jun. 10, 1993 & JP 05 024848 A (Dainichiseika Color), Feb. 2, 1993 abstract.

* cited by examiner

Primary Examiner—C. Melissa Koslow
Assistant Examiner—Shalie A. Manlove
(74) Attorney, Agent, or Firm—Raymond F. Keller

(57) ABSTRACT

One aspect of the invention relates to a brown pigment composition with excellent weathering resistance containing iron oxide, chromium oxide, and one or more alumina and/or silica components. Another aspect of the invention relates to a method of making a brown pigment involving combining iron oxide, chromium oxide, and one or more alumina and/or silica components to form a mixture and heating the mixture to provide brown pigment particles. Yet another aspect of the invention relates to a plastic composition containing a major amount of a plastic material and a minor amount of a brown pigment composition containing iron oxide, chromium oxide, and one or more alumina and/or silica components.

25 Claims, No Drawings

HIGH STRENGTH FE-CR BROWN WITH EXCELLENT WEATHERING

FIELD OF THE INVENTION

The present invention generally relates to various aspects related to brown pigments containing iron and chromium. In particular, the present invention relates to brown pigments having desirable weathering characteristics, methods of making the brown pigments, plastics and other materials containing the brown pigments, and methods of using the brown pigments.

BACKGROUND OF THE INVENTION

Iron oxide is often used with other components to make brown Complex Inorganic Color Pigments (CICP). A CICP is a pigment made by heating a number of different metal oxides. Relatively large, coarse, and/or hard particles often lead to problems in some CICP applications.

The large, coarse, and/or hard CICP particles may be employed in substances such as concrete. However, CICP particles used for coloring coatings, plastics, lacquers and synthetic resins are typically subjected to intensive grinding. The disadvantages associated with intensive grinding include the undesirable formation dust, difficulties in measuring the ground CICP particles, and difficulties in dispensing with the ground CICP particles.

Moreover, in order for CICP particles used for coloring coatings, plastics, lacquers and synthetic resins, high temperature stability is often required since these materials are often processed or exposed to high temperatures. Coatings, plastics, lacquers and synthetic resins also typically require pigments with good weathering characteristics since lengthy exposure to the outdoor environment is common. In the case of vinyl siding for homes, outdoor exposure lasts many years. Many brown pigments unfortunately lack good weathering characteristics.

The ability to tint pigments is also a desirable characteristic. A pigment with high tinting strength has broader applications and may be used in a number of different settings. Unfortunately, many brown pigments lack strong tinting characteristics.

Some brown CICP formulations have one or two desirable properties as well as several undesirable properties. For example, some brown pigments are strong, but have poor weathering characteristics, poor heat resistance, weak tinting strength, undesirable color shades, and/or costly starting materials. Specifically, conventional PBr 29 is strongly brown but has poor weathering characteristics. It is therefore not commonly employed in outdoor applications where such characteristics are required. Conventional PY 164 (based on manganese-antimony-titanium), often employed as a brown pigment, has good weathering characteristics, but poor tinting strength.

Given these circumstances, when employing a brown CICP formulation, one must accept a compromise on at least one desirable property. There is thus an unmet need in the art for a brown CICP formulation having many desirable properties including good weathering.

SUMMARY OF THE INVENTION

The present invention provides brown CICP formulations that possess high pigment strength, excellent weathering characteristics, high temperature resistance, and excellent tinting strength. The brown CICP formulations of the present invention possess many desirable characteristics thus minimizing the compromises typically required when selecting a brown pigment.

One aspect of the invention relates to a brown pigment composition with excellent weathering resistance containing iron oxide, chromium oxide, and one or more alumina and/or silica components. Another aspect of the invention relates to a method of making a brown pigment involving combining iron oxide, chromium oxide, and one or more alumina and/or silica components to form a mixture and heating the mixture to provide brown pigment particles. Yet another aspect of the invention relates to a plastic composition containing a major amount of a plastic material and a minor amount of a brown pigment composition containing iron oxide, chromium oxide, and one or more alumina and/or silica components.

DETAILED DESCRIPTION OF THE INVENTION

The present invention provides brown iron-chromium pigments that possess at least one of high pigment strength, good weathering characteristics, high tinting strength, high temperature resistance, small particle size, stable during handling, stable to oxidation, and highly dispersible.

The brown iron-chromium pigments contain at least three components; namely, iron oxide, chromium oxide, and one or more alumina and/or silica components. The brown iron-chromium pigments optionally contain other components such as a binder, dispersant, and/or mineralizer. The iron oxide and chrome oxide form a crystal structure typically represented by the formula $[Fe,Cr]_2O_3$, corresponding to a PBr 29 pigment, wherein the crystal structure contains more iron than chromium.

The iron oxide of the brown iron-chromium pigments contributes to the strength of the pigment. Iron oxide primarily contains yellow iron oxide; that is, $Fe_2O_3.H_2O$ or FeOOH (hydrated iron (III) oxide). Forms of yellow iron oxide include $\alpha$-FeOOH and $\gamma$-FeOOH. Other forms of iron oxide, which may be used in addition to yellow iron oxide include $Fe_3O_4$ (iron (II, III) oxide) also known as $FeO.Fe_2O_3$, $Fe_2O_3$ (iron (III) oxide including $\alpha$-$Fe_2O_3$ and/or $\gamma$-$Fe_2O_3$), $Fe(OH)_2$, and $Fe(OH)_3$. Iron oxides are commercially available and/or may be made from iron oxide precursors.

Although not necessary, it is preferred to employ iron oxide or iron oxide precursors having a relatively small particle size. For example, iron oxide having an average particle size (by weight) of about 5 $\mu$m or less is employed. In another embodiment, iron oxide having an average particle size (by weight) of about 1 $\mu$m or less is employed.

In one embodiment, the brown iron-chromium pigments of the present invention contain from about 30% to about 80% by weight of iron oxide. In another embodiment, the brown iron-chromium pigment contains from about 35% to about 75% by weight of iron oxide. In yet another embodiment, the brown iron-chromium pigment contains from about 40% to about 70% by weight of iron oxide.

The chromium oxide of the brown iron-chromium pigments contributes to the strength of the pigment. Chromium oxide primarily contains $Cr_2O_3$ (chromium (III) oxide), but may also contain chromium (VI) oxide. In one embodiment, the brown iron-chromium pigments do not contain chromium (VI) oxide, or contain less than about 0.001% by weight chromium (VI) oxide. Chromium oxide is commercially available and/or may be made from chromium oxide precursors. Chromium oxide precursors include chromium acetate, chromium bromide, chromium chloride, chromium fluoride, chromium nitrate, and chromium sulfate.

Although not necessary, it is preferred to employ chromium oxide or chromium oxide precursors having a relatively small particle size. For example, chromium oxide having an average particle size (by weight) of about 5 µm or less is employed. In another embodiment, chromium oxide having an average particle size (by weight) of about 2 µm or less is employed.

In one embodiment, the brown iron-chromium pigments of the present invention contain from about 5% to about 50% by weight of chrome oxide. In another embodiment, the brown iron-chromium pigment contains from about 10% to about 45% by weight of chromium oxide. In yet another embodiment, the brown iron-chromium pigment contains from about 15% to about 40% by weight of chromium oxide.

In some instances, the ratio of iron to chromium in the resultant pigment falls within a suitable range for maximizing color strength and/or maintaining crystal structure indicative of a PBr 29 pigment. This crystal structure is represented by the formula $[Fe,Cr]_2O_3$. This structure is determined/confirmed using X-ray diffraction. In this connection, in one embodiment, the ratio of iron to chromium is from about 1:1 to about 5:1 by weight (which also corresponds to the amounts of iron oxide and chromium oxide initially combined). In another embodiment, the ratio of iron to chromium is from about 1.5:1 to about 4:1 by weight. In yet another embodiment, the ratio of iron to chromium is from about 2:1 to about 3.5:1 by weight. In most embodiments, there is more iron in the brown iron-chromium pigments than chromium.

The PBr 29 type pigment of the present invention has a crystal structure that is different from the crystal structure of PBr 35 pigments, which have a spinel structure. PBr 35 pigments have a structure represented by the formula $FeCr_2O_4$ or $FeO.Cr_2O_3$. Spinel structures have the general formula $AB_2O_4$. The PBr 29 type pigment of the present invention does not have a spinel structure. The PBr 29 type pigment of the present invention has a crystal structure that is different from the crystal structure of PG 17 pigments, which have a hematite structure. PG 17 pigments have a structure represented by the formula $Cr_2O_3$. The PBr 29 type pigment of the present invention does not have a hematite structure.

The one or more alumina and/or silica components of the brown iron-chromium pigments contribute to the weathering and heat resistance properties. The alumina and/or silica component contains at least one alumina component and at least one silica component or the alumina and/or silica component contains at least one alumina-silica component. Alumina components contain at least aluminum and oxygen atoms and include alumina (aluminum oxide, $Al_2O_3$), aluminum hydroxide ($Al(OH)_3$) or alumina trihydrate ($Al_2O_3.3H_2O$). Silica components contain at least silicon and oxygen atoms and include silicates and silica (silicon dioxide) such as powdered silica, fused silica, amorphous silica, arc silica, fumed silica, fused silica. Silica may be derived from sand, quartz, flint, and diatomite. Alumina-silica components contain at least aluminum, silicon, and oxygen atoms and include alumina-silica fiber (made from molten alumina and silica), aluminosilicates, attapulgite, bentonite, halloysite, illite, kaolin, and montmorillonite.

Kaolin includes hydrous kaolin, calcined kaolin, and meta-kaolin. In this connection, heat treated alumina-silica components may be employed, such as calcined attapulgite, calcined bentonite, calcined halloysite, calcined illite, and calcined montmorillonite.

In one embodiment where the alumina and/or silica component contains at least one alumina component and at least one silica component, the alumina and/or silica component contains from about 40% to about 70% by weight of at least one alumina component and from about 30% to about 60% by weight of at least one silica component. In another embodiment where the alumina and/or silica component contains at least one alumina component and at least one silica component, the alumina and/or silica component contains from about 45% to about 65% by weight of at least one alumina component and from about 35% to about 55% by weight of at least one silica component.

Even though one or more alumina and/or silica components are incorporated into the brown iron-chromium pigments of the present invention, a spinel structure and/or a hematite structure are not obtained.

Although not necessary, it is preferred to employ one or more alumina and/or silica components having a relatively small particle size. In one embodiment, kaolin having an average particle size (by weight) of about 5 µm or less is employed. In another embodiment, kaolin having an average particle size (by weight) of about 2 µm or less is employed.

In one embodiment, the brown iron-chromium pigments of the present invention contain from about 2.5% to about 50% by weight of one or more alumina and/or silica components. In another embodiment, the brown iron-chromium pigment contains from about 5% to about 45% by weight of one or more alumina and/or silica components. In yet another embodiment, the brown iron-chromium pigment contains from about 7.5% to about 40% by weight of one or more alumina and/or silica components.

The optional mineralizer of the brown iron-chromium pigments may contribute to the strength of the pigment, induce minor color changes in the pigment, and/or reduce the heating temperature required to make the pigment. Mineralizers include metal fluorides, metal chlorides, and metal sulfates. Specific examples of mineralizers include $BaF_2$, $SrF_2$, $CaF_2$, $MgF_2$, $NaF$, $KCl$, $KF$, $NH_4Cl$, $BaCl_2$, $SrCl_2$, $CaCl_2$, $MgCl_2$, $NaCl$, $BaSO_4$, $SrSO_4$, $CaSO_4$, $Na_2SO_4$, and $MgSO_4$, $MoO_3$, and the like. These compounds are commercially available and/or may be made using methods known in the art.

In one embodiment, the brown iron-chromium pigments of the present invention optionally contain from about 0.01% to about 10% by weight of a mineralizer. In another embodiment, the brown iron-chromium pigment optionally contains from about 0.1% to about 5% by weight of a mineralizer. In yet another embodiment, the brown iron-chromium pigment optionally contains from about 0.5% to about 2% by weight of a mineralizer. In still yet another embodiment, the brown iron-chromium pigment consists essentially of iron oxide, chrome oxide, one or more alumina and/or silica components and optionally a mineralizer such as barium fluoride.

In some instances, the ratio of iron oxide to mineralizer such as barium fluoride falls within a suitable range for maximizing color strength. In this connection, in one embodiment, the ratio of iron oxide to the mineralizer is from about 10:1 to about 70:1 by weight. In another embodiment, the ratio of iron oxide to the mineralizer is from about 30:1 to about 50:1 by weight.

The brown iron-chromium pigments of the present invention may further optionally contain at least one inorganic material. Such inorganic materials include titanium dioxide, boron oxide, and salts such as sodium chloride or other alkali metal salts. When present, these supplemental inorganic materials are present from about 0.01% to about 10% by weight.

In one embodiment, the brown iron-chromium pigments of the present invention do not contain cobalt. In another embodiment, the brown iron-chromium pigments of the present invention do not contain nickel. In yet another embodiment, the brown iron-chromium pigment consists essentially of iron oxide, chromium oxide, and kaolin. In still yet another embodiment, the brown iron-chromium pigment consists essentially of iron oxide, chromium oxide, and aluminum hydroxide and/or silica. In another embodiment, the brown iron-chromium pigment consists essentially of iron oxide, chromium oxide, and alumina and/or silica.

In one embodiment, the brown iron-chromium pigments of the present invention further contain at least one of a binder and a dispersant. In such embodiments, the binder and/or dispersant are present in an amount from about 0.01% to about 2% by weight. In another embodiment, the brown iron-chromium pigments of the present invention do not contain a binder and/or a dispersant (a dispersant-free pigment, a binder-free pigment, or a dispersant/binder-free pigment).

Generally speaking, the brown iron-chromium pigments of the present invention are made by combining the three required components and one or more optional ingredients to form a mixture, heating the mixture, and reducing the particle size of the resultant powder, if necessary and/or desired, for a given end use.

Optionally, after combining at least the iron oxide, chromium oxide, one or more alumina and/or silica components, and one or more optional ingredients to form a mixture and before heating, the mixture is blended. Blending or mixing is conducted by any suitable means including using a blender, using a Waring mixer, and the like. Blending promotes the formation of a uniform mixture. Blending also promotes the formation of a uniform mixture after heating.

The mixture of components is then heated to form a solid solution in the form of a powder. In a preferred embodiment, the mixture of components is heated to a calcination temperature to form the solid solution of a powder. The atmosphere during heating is typically air, but an oxygen rich (containing more than about 21% by weight oxygen) atmosphere, or an inert gas atmosphere may also be employed. Inert gases include nitrogen, helium, neon, argon, and xenon.

During heating, the brown pigment is initially formed and substantially all of the oxide precursors, if present, are converted to their corresponding oxides. The Loss-on-Ignition (LOI) is a measure of the relative amount of a substance which is converted to its corresponding oxide during calcination. The LOI of the CICP formulations according to the present invention are typically from about 1% to about 20% by weight. In another embodiment, the LOI of the CICP formulations according to the present invention are typically from about 2% to about 15% by weight.

Heating is performed using any suitable apparatus known in the art such as a rotary kiln, tunnel kiln, Harrop kiln, shuttle kiln, Pereny kiln, rotary calciner, vertical calciner, high temperature cyclone, and the like. The temperature for heating is generally from about 650° C. to about 1,300° C. In another embodiment, the calcination temperature is from about 675° C. to about 1,100° C. In yet another embodiment, the calcination temperature is from about 700° C. to about 1,000° C. The mixture is heated for a sufficient period of time at the calcination temperature to form a solid solution. In one embodiment, the mixture is heated from about 1 to about 5 hours at the calcination temperature. In another embodiment, the formulation is heated from about 2 to about 4 hours at the calcination temperature.

In one embodiment, the mixture is placed in a suitable heating apparatus that is at the calcination temperature. In another embodiment, the mixture is placed in a suitable heating apparatus and the temperature is increased (ramped) to the calcination temperature. In this embodiment, the temperature is increased to the calcination temperature over a period of time from about 1 to about 12 hours.

The resultant CICP composition, which is typically in powdered form, may be optionally processed to reduce particle sizes or particle size ranges to more useful sizes or more useful size ranges. Any suitable apparatus normally used for the mechanical agitation of solid materials may be utilized including blenders, pulverizers, grinders, mixers, rotating cylinders, tumbling barrels, ball mills, hammer mills, jet mills, roller mills, disc mills, and the like. In many instances, application of shear mixing or jet milling is sufficient to disperse and/or reduce particle sizes. In other instances, pulverizing the heat treated composition is sufficient to disperse and/or reduce particle sizes.

The resultant brown CICP composition contains particles having a relatively small particle size; that is, having an average size (by volume) from about 0.01 microns to about 10 microns. In another embodiment, the brown CICP composition contains particles having an average size from about 0.1 microns to about 5 microns. In yet another embodiment, the brown CICP composition contains particles having an average size from about 0.25 microns to about 2 microns.

In one embodiment, resultant brown CICP composition contains particles having a substantially spherical shape of the particles, flow characteristics are markedly improved compared to conventional brown pigment compositions. As a result of the substantially spherical shape of the particles, the particles tend not to agglomerate or aggregate. Decreased agglomeration and/or aggregation leads to reduced residue levels. Consequently, use of the brown CICP composition in paints, coatings, inks, plastics and the like may be facilitated.

The resultant brown iron-chromium pigments of the present invention have a relatively high absorption capacity for visible light for a brown pigment. This is confirmed by the lightness/darkness value, commonly represented by L*. The lightness/darkness value is determined by combining 1.5 g of the pigment with 10 g of titanium dioxide, and incorporating the combination into 100 g of rigid polyvinyl chloride to form a plaque, and testing the plaque. On one hand, many commercially available brown pigments have L* values in the upper 60's, such as from 66 to 70, which is often too light to effectively perform as a brown pigment in some applications. In one embodiment, the brown iron-chromium pigments of the present invention have L* values of about 65 or less. In another embodiment, the brown iron-chromium pigments have L* values of about 63 or less. In yet another embodiment, the brown iron-chromium pigments have L* values of about 62 or less.

In one embodiment, the brown iron-chromium pigments of the present invention have L* values of about 57 or more. In another embodiment, the brown iron-chromium pigments have L* values of about 58 or more. In yet another embodiment, the brown iron-chromium pigments have L* values of about 59 or more.

The resultant brown iron-chromium pigments of the present invention have a brown shade. Brown shade is commonly measured by b* values, wherein a positive value indicates a yellow tinge and a negative value indicates a blue tinge. The resultant brown iron-chromium pigments of the present invention also have a red shade. Red shade is commonly measured by a* values, wherein a positive value indicates a red tinge and a negative value indicates a green tinge. The shade is determined by combining 1.5 g of the pigment with 10 g of titanium dioxide, and incorporating the combination into 100 g of rigid polyvinyl chloride to form a plaque, and testing the plaque. In one embodiment, the brown iron-chromium pigments of the present invention have a* values of about 6 or more and b* values of about 3 or more. In another embodiment, the brown iron-chromium pigments have a* values of about 7 or more and b* values of about 5 or more. In yet another embodiment, the brown iron-chromium pigments have a* values of about 10 or more and b* values of about 8 or more.

The brown CICP compositions according to the present invention have high tinting strength. Tinting strength is the ability to be lightened, while retaining original color, with a white pigment such as titanium dioxide.

The brown CICP compositions according to the present invention can be incorporated into any material requiring color. Examples of materials in which the brown CICP compositions may be incorporated include paints, coatings, inks, tapes, plastics, fibers, ceramics, concrete, mortars, and the like. Specific examples of inks include printing inks and lacquers, and specific examples of plastics include thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride, polyvinyl fluoride, polyvinyl acetal, polyvinyl alcohol, and polyvinyl acetate, polyesters and rubber, and also filaments made of viscose and cellulose ethers, cellulose esters, polyamides, polycarbonates, polyurethanes, polyesters, for example polyglycol terephthalates, and polyacrylonitrile.

Typically, a minor amount of the brown CICP compositions may be incorporated into a major amount of a paint, coating, ink, tape, plastic, fiber, ceramic, concrete, mortar, and the like. Major amounts include at least 50% by weight whereas minor amounts include less than 50% by weight.

See, for example, with regard to ink: R. H. Leach, editor, *The Printing Ink Manual,* Fourth Edition, Van Nostrand Reinhold (International) Co. Ltd., London (1988), particularly pages 282–591; with regard to paints: C. H. Hare, *Protective Coatings,* Technology Publishing Co., Pittsburgh (1994), particularly pages 63–288; and with regard to plastics: T. G. Webber, *Coloring of Plastics,* John Wiley & Sons, New York (1979), particularly pages 79–204. The foregoing references are hereby incorporated by reference herein for their teachings of ink, paint and plastic compositions, formulations and vehicles in which the brown CICP compositions of this invention may be used including amounts of colorants.

Especially when incorporated in film or fiber forming materials, such as paints, coatings, and plastics, the brown CICP compositions according to the present invention display strong and bright brown color while not degrading the integrity and uniformity of the resultant films, fibers, and plastics. The brown CICP compositions not degrading the integrity and uniformity of the resultant films, fibers and plastics which can be as thin as about 3 mils, and even about 2 mils.

When incorporated into plastics, especially polyvinyl compounds and polyolefins, the brown CICP compositions according to the present invention not only display strong and bright brown color, but also exhibit excellent weathering characteristics. As a result, plastics containing the brown CICP compositions may be advantageously employed in outdoor uses or other harsh environments.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

67.62 g of chromium oxide, 262.5 g of yellow iron oxide, 116.93 g of aluminum hydroxide, and 77.95 g of silica are combined and blended to form a uniform mixture. The mixture is then heated at a temperature of 800° C. for 3 hours. After calcination, the mixture is powdered to provide a brown pigment.

EXAMPLE 2

520.2 g of chromium oxide, 1162.8 g of yellow iron oxide, and 180 g of kaolin are combined and blended to form a uniform mixture. The mixture is then heated at a temperature of 900° C. for 3 hours. After calcination, the mixture is blended to provide a brown pigment.

EXAMPLE 3

6.84 g of chromium oxide, 25 g of yellow iron oxide, and 18.16 g of a mixture of 60% by weight aluminum hydroxide and 40% by weight silica are combined and blended to form a uniform mixture. The mixture is then heated at a temperature of 800° C. for 3 hours. After calcination, the mixture is milled to provide a brown pigment.

EXAMPLE 4

6.44 g of chromium oxide, 25 g of yellow iron oxide, and 18.56 g of a mixture of 60% by weight aluminum hydroxide and 40% by weight silica are combined and blended to form a uniform mixture. The mixture is then heated at a temperature of 800° C. for 3 hours. After calcination, the mixture is milled to provide a brown pigment.

EXAMPLE 5

67.62 g of chromium oxide, 262.5 g of yellow iron oxide, and 194.88 g of a mixture of 60% by weight aluminum hydroxide and 40% by weight silica are combined and blended to form a uniform mixture. The mixture is then heated at a temperature of 800° C. for 3 hours. After calcination, the mixture is pulverized to provide a brown pigment.

EXAMPLE 6

70 g of chromium oxide, 260 g of yellow iron oxide, and 190 g of aluminum hydroxide, are combined and blended to form a uniform mixture. The mixture is then heated at a temperature of 650° C. for 3 hours. After calcination, the mixture is powdered.

EXAMPLE 7

70 g of chromium oxide, 260 g of yellow iron oxide, and 190 g of silica are combined and blended to form a uniform mixture. The mixture is then heated at a temperature of 675° C. for 3 hours. After calcination, the mixture is powdered.

Comparative Example 1

102.4 g of chromium oxide and 397.6 g of yellow iron oxide are combined and blended to form a uniform mixture.

The mixture is then heated at a temperature of 800° C. for 3 hours. After calcination, the mixture is milled to provide a pigment. This is a conventional PBr 29 pigment.

Comparative Example 2

PY 164, often used as a conventional brown pigment.

Comparative Example 3

6.84 g of chromium oxide and 25 g of yellow iron oxide are combined and blended to form a uniform mixture. The mixture is then heated at a temperature of 800° C. for 3 hours. After calcination, the mixture is milled to provide a pigment.

Comparative Example 4

6.44 g of chromium oxide and 25 g of yellow iron oxide are combined and blended to form a uniform mixture. The mixture is then heated at a temperature of 800° C. for 3 hours. After calcination, the mixture is milled to provide a pigment.

The L* values, a* values, and b* values, of some of the examples and comparative examples are reported in Table 1. The shade is determined by combining 1.5 g of the pigment with 10 g of titanium dioxide, and incorporating the combination into 100 g of rigid polyvinyl chloride to form a plaque, and testing the plaque. The data indicates that, compared to the comparative examples, the pigments of the present invention are desirably lighter (less black) as indicated by the higher L* values, desirably redder as indicated by the higher a* values, and desirably yellower as indicated by the higher b* values.

TABLE 1

| Pigment | L* | a* | b* |
| --- | --- | --- | --- |
| Example 3 | 60.34 | 7.73 | 2.99 |
| Com. Example 3 | 55.26 | 6.48 | 1.14 |
| Example 4 | 60.29 | 7.91 | 3.15 |
| Com. Example 4 | 55.32 | 6.68 | 1.23 |

The lightness/darkness value, red shade, brown shade, and tint strength of Example 1 is compared with those of Comparative Example 2, a conventional PY 164 pigment, and are reported in Table 2 as ΔL*, Δa*, Δb*, and relative tint strength. The values are determined by combining 1.5 g of the pigment with 10 g of titanium dioxide, and incorporating the combination into 100 g of rigid polyvinyl chloride to form a plaque, and testing the plaque. The data indicates that, compared to a conventional brown pigment, the pigment of Example 1 according to the present invention is desirably darker (less than upper 60's) as indicated by the lower L* value, desirably redder as indicated by the higher a* value, and bluer as indicated by the lower b* value. The tinting strength of Example 1 is about twice that of Comparative Example 2.

TABLE 2

| Pigment | ΔL* | Δa* | Δb* | tint strgth |
| --- | --- | --- | --- | --- |
| Example 1 | −6.49 | 1.91 | −1.38 | ~2X |

The weatherability (particularly long term weatherability) of Example 1 is compared with that of Comparative Example 1, a conventional PBr 29 pigment, and is reported in Table 3. A lower ΔE value means that less change in the lightness/darkness values, red shades, and brown shades are observed. The values are determined by combining n amount of the pigment with 10 g of titanium dioxide to provide an L* value of 60, and incorporating the combination into 100 g of rigid polyvinyl chloride to form a plaque, exposing the plaque to ultraviolet light for set periods of time, and testing the plaque at the intervals. For Example 1, 1.59 g of pigment is combined with 10 g of titanium dioxide while for Comparative Example 1, 0.997 g of pigment is combined with 10 g of titanium dioxide. ΔE is derived from the difference between the square root of the sum of the squares of ΔL*, Δa*, and Δb* from one of the set periods of time and prior to ultraviolet exposure. The data indicates that the pigment of Example 1 according to the present invention experiences markedly less change in lightness/darkness values, red shades, and yellow shades during exposure to ultraviolet radiation compared to Comparative Example 1, a conventional PBr 29 pigment.

TABLE 3

| Pigment | hours | ΔE |
| --- | --- | --- |
| Example 1 | 1000 | 1.54 |
| Com. Example 1 | 1000 | 1.81 |
| Example 1 | 2000 | 2.94 |
| Com. Example 1 | 2000 | 4.02 |
| Example 1 | 3000 | 4.21 |
| Com. Example 1 | 3000 | 5.94 |

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A brown pigment composition, comprising:
   from about 30% to about 80% by weight of iron oxide;
   from about 5% to about 50% by weight of chromium oxide; and
   from about 2.5% to about 50% by weight of alumina and silica components, the alumina and silica comprising from about 40% to about 70% by weight of at least one alumina component and from about 30% to about 60% by weight of at least one silica component,
   the brown pigment composition having excellent resistance to weathering.

2. The brown pigment composition according to claim 1 further comprising from about 0.01% to about 10% by weight of a mineralizer comprising at least one selected from the group consisting of $BaF_2$, $SrF_2$, $CaF_2$, $MgF_2$, $NaF$, $KCl$, $KF$, $NH_4Cl$, $BaCl_2$, $SrCl_2$, $CaCl_2$, $MgCl_2$, $NaCl$, $BaSO_4$, $SrSO_4$, $CaSO_4$, $Na_2SO_4$, $MoO_3$, and $MgSO_4$.

3. The brown pigment composition according to claim 1 further comprising from about 0.01% to about 10% by weight of at least one inorganic material selected from titanium dioxide, boron oxide, and alkali metal salts.

4. The brown pigment composition according to claim 1 further comprising from about 0.01% to about 2% by weight of at least one of a binder and a dispersant.

5. The brown pigment composition according to claim 1, the alumina and silica components comprising one or more selected from the group consisting of alumina-silica fiber, aluminosilicates.

6. The brown pigment composition according to claim 1 having an L* value of about 65 or less and about 57 or more, an a* value of about 6 or more, and a b* value of about 3 or more.

7. A method of making a brown pigment comprising:

combining from about 30% to about 80% by weight of iron oxide, from about 5% to about 50% by weight of chromium oxide, and from about 2.5% to about 50% by weight of alumina and silica components, the alumina and silica comprising from about 40% to about 70% by weight of at least one alumina component and from about 30% to about 60% by weight of at least one silica component, to form a mixture;

heating the mixture to a temperature from about 650° C. to about 1,300° C. for a time from about 1 to about 5 hours; and optionally agitating the heated mixture to provide brown pigment particles having an average size by volume from about 0.01 microns to about 10 microns.

8. The method according to claim 7, wherein the iron oxide comprises hydrated iron (III) oxide.

9. The method according to claim 7, wherein the mixture is heated to a temperature from about 750° C. to about 1,100° C. for a time from about 2 to about 4 hours.

10. The method according to claim 7, wherein iron oxide and chromium oxide are combined in a ratio from about 2:1 to about 3.5:1.

11. The method according to claim 7, wherein the brown pigment particles have a crystal structure represented by [Fe,Cr]$_2$O$_3$.

12. The method according to claim 7, wherein the mixture is blended prior to heating.

13. The method according to claim 7, wherein agitating the heated mixture comprises pulverizing the heated mixture.

14. The method according to claim 7, wherein agitating the heated mixture comprises jet milling the heated mixture.

15. The method according to claim 7, wherein the brown pigment particles have an average size by volume from about 0.1 microns to about 5 microns.

16. A brown pigment composition prepared according to the method of claim 7.

17. A paint composition comprising a major amount of a paint vehicle and a minor amount of the brown pigment composition of claim 1.

18. An ink composition comprising a major amount of an ink vehicle and a minor amount of the brown pigment composition of claim 1.

19. A plastic composition comprising a major amount of a plastic material and a minor amount of the brown pigment composition of claim 1.

20. A plastic composition comprising:

a major amount of a plastic material and a minor amount of a brown pigment composition comprising from about 30% to about 80% by weight of iron oxide;

from about 5% to about 50% by weight of chromium oxide; and from about 2.5% to about 50% by weight of alumina and silica components, the alumina and silica comprising from about 40% to about 70% by weight of at least one alumina component and from about 30% to about 60% by weight of at least one silica component, wherein the brown pigment composition has an L* value of about 65 or less and about 57 or more.

21. The plastic composition according to claim 20, wherein the plastic material comprises at least one of polystyrene, one or more polyolefins, one or more polyacrylic compounds, one or more polyvinyl compounds, one or more polyesters, cellulose ether, cellulose ester, polyamide, polycarbonate, polyurethane, and polyacrylonitrile.

22. A brown pigment composition, comprising:

from about 30% to about 80% by weight of iron oxide;

from about 5% to about 50% by weight of chromium oxide; and from about 2.5% to about 50% by weight of alumina and silica components, the brown pigment composition having excellent resistance to weathering.

23. The brown pigment composition according to claim 22 having an L* value of about 65 or less and about 57 or more, an a* value of about 6 or more, and a b* value of about 3 or more.

24. A method of making a brown pigment comprising:

combining from about 30% to about 80% by weight of iron oxide, from about 5% to about 50% by weight of chromium oxide, and from about 2.5% to about 50% by weight of alumina and silica components to form a mixture;

heating the mixture to a temperature from about 650° C. to about 1,300° C. for a time from about 1 to about 5 hours; and optionally agitating the heated mixture to provide brown pigment particles having an average size by volume from about 0.01 microns to about 10 microns.

25. A plastic composition comprising:

a major amount of a plastic material and a minor amount of a brown pigment composition comprising from about 30% to about 80% by weight of iron oxide;

from about 5% to about 50% by weight of chromium oxide; and from about 2.5% to about 50% by weight of alumina and silica components, wherein the brown pigment composition has an L* value of about 65 or less and about 57 or more.

* * * * *